United States Patent Office 3,523,152
Patented Aug. 4, 1970

3,523,152
PROCESS FOR MAKING PLASTIC ARTICLES
Robert W. Curtis, Terrace Park, Ohio, assignor to The Cincinnati Milling Machine Co., Cincinnati, Ohio, a corporation of Ohio
Continuation of application Ser. No. 345,300, Feb. 17, 1964. This application Mar. 24, 1969, Ser. No. 810,033
Int. Cl. B29c 9/00
U.S. Cl. 264—246                  8 Claims

ABSTRACT OF THE DISCLOSURE

Marking of a metallic foil-clad plastic panel with ink indicia is accomplished by forming a layup including a metallic foil on a supporting member. An uncured flowable heat curable thermosetting resin material is placed over the foil and a reinforcement system assembled over the resin. Thereafter, an indicia bearing release sheet is assembled over the resin-reinforcement system with the indicia facing the reinforcement system and spaced from the resin thereby. The resin-reinforcement layup and assembled release sheet are placed in a mold and heat and pressure are simultaneously applied to impregnate the resin-reinforcement system, to fill the mold, and to effect substantial curing of the resin while effecting transfer of the indicia to the surface of the panel. Various resins and reinforcement systems are also described.

---

This invention relates to the marking of plastic articles with identifying data and, more particularly, to a marking system in which a material of contrasting color is incorporated in the surface of the plastic article during the molding operation to provide it with a distinct and serviceable type of marking. This application is a continuation of copending application Ser. No. 345,300, filed Feb. 17, 1964, now abandoned, and assigned to the same assignee.

In connection with the manufacture of molded plastic articles, it is often desirable to provide the articles with identifying marks or symbols of a durable nature in order to indicate the origin and character of the goods. In the past this has usually been effected by molding the identifying indicia directly upon the surface of the article in the form of either raised or depressed letters or symbols. This type of marking is, however, rather costly, especially in those cases where the marking includes a brand or quality designation which must be changed frequently during production. Another method heretofore used in the marking of plastic articles has been to press the ink or other marking material into the shaped plastic surface while the latter was in a heated and softened condition. This caused the marking material to become attached to the plastic surface and provided the desired marking on the face of the article. It has now been discovered that it is possible to carry the hot marking procedure one step further and to effect the marking of the molded articles as an incident to the molding operation itself. In other words, in those types of molding operations in which an unformed mass of resin, such as a monomer-polymer syrup, is placed in a mold and subjected to heat and pressure to form a molded article, it is now possible to provide the article with ink type markings or indicia which are molded directly into the surface of the plastic body during the molding operation. Thus, a simple and inexpensive means of marking molded articles is provided by the new technique as will be more fully understood from the following description.

In general, the present invention relates to a molding operation wherein a monomer-polymer resin mixture having the consistency of a syrup or paste at room temperature, is brought into contact with the ink imprinted surface of a release sheet and molded under heat and pressure while being maintained in intimate contact with the ink. During molding, the ink is subjected to the solvent action of the hot, liquid resin and, as a result, becomes united with the resin on the surface of the molded article. Consequently, when the article is removed from the mold and the release sheet is stripped off of the relatively cool and rigid surface of the plastic, the ink will remain embedded in the resin on the surface of the article. Thus, the ink indicia is effectively transferred to the face of the molded article as an incident to the molding process. The marking so effected is of a permanent nature and can only be obliterated by abrasion which is sufficiently severe as to cause removal of the surface of the article itself.

It is, therefore, an object of the present invention to provide a new and improved method of marking the surface of a molded plastic article with identifying indicia as an incident to the molding operation.

Another object of the invention is to provide a method of marking molded plastic articles during the molding operation wherein a monomer-polymer resin mixture having the consistency of a syrup or paste at room temperature is molded, under heat and pressure, in intimate contact with the ink imprinted surface of a release sheet so as to effect a transfer of the ink from the release sheet to the surface of the molded plastic article.

Another object of the present invention is the provision of an improved process for simultaneously curing and effecting marking or printing on a molded plastic article.

With these and other objects in view, the invention includes certain novel procedures and materials resulting therefrom, as will be better understood from the following description considered in connection with the accompanying drawings which form a part of this specification.

Figure 1:
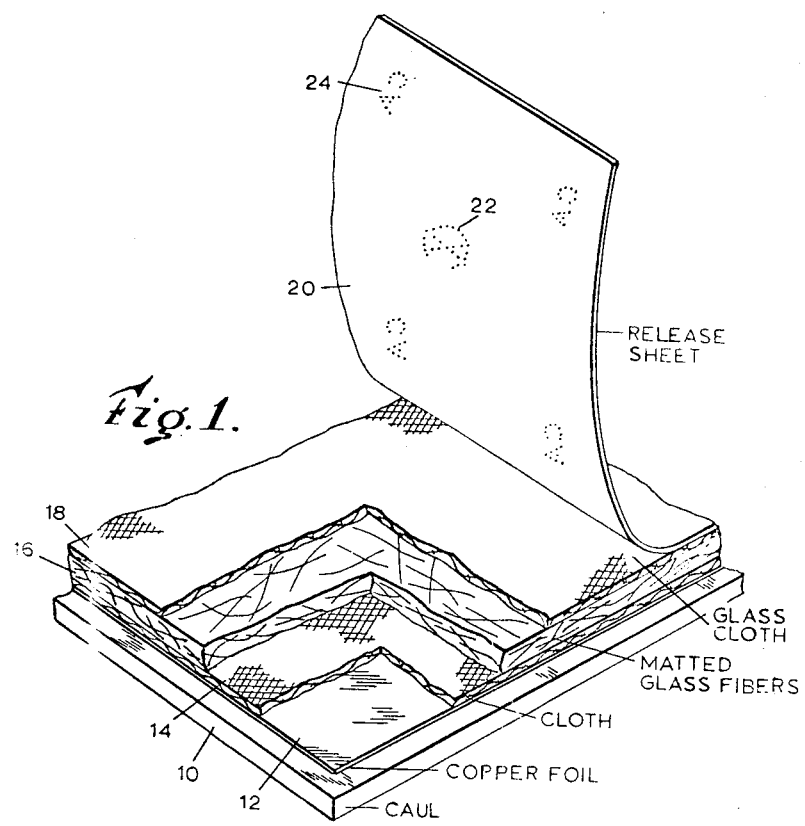
FIG. 1 is a perspective view of a reinforced panel layup with the release sheet turned up to show the ink indicia imprinted thereon.

The copper clad laminate shown in the drawings illustrates but one of a number of different molded plastic products to which the present invention may be applied. The electrical panel illustrated herein consists of a glass-reinforced plastic base which is molded directly onto the copper foil to thereby form a completed panel in a single pressing operation. To produce the panel, the copper foil and reinforcement material are laid up on a sheet metal caul 10 (FIGS. 1 and 2) which serves as a pallet for handling the assembly prior to molding. In assembling the layup, the copper foil 12 is laid on the upper surface of the caul which, if desired, may be coated with a conventional mold release agent. A layer of woven glass cloth 14 is then placed on top of the copper foil after which a measured amount of a monomer-polymer resin syrup is poured onto the cloth and leveled off with a doctor blade. Following this, a layer of matted glass fibers 16 and a second layer of glass cloth 18 are placed in this order on top of the liquid resin. The layup is covered with a release sheet 20 which is placed on top of the assembled panel materials and the unit is made ready for transfer to the molding press where the panel is molded under heat and pressure in accordance with conventional molding practice to form a unitary panel structure. The finished panel thus formed comprises a glass-reinforced insulating plastic base to which is adhered a layer of copper foil. The particular resin employed in the manufacture of this product was a solution of methacrylate polymer in methacrylate monomer to which was added a minor proportion of an alpha-beta unsaturated polyester to promote the adhesion of the copper foil to the plastic base.

The release sheet used in the molding operation may be any smooth surfaced material which will not be adversely affected by the heat and pressure of the molding step, or by the liquid resin employed in the formulation of the panel. It must also, of course, have the property of not sticking or adhering to the plastic surface of the article after molding has been completed. In the present instance, a sheet of vegetable parchment paper treated with a suitable release agent, such as an organic chrome complex, was used for this purpose.

Figure 2:
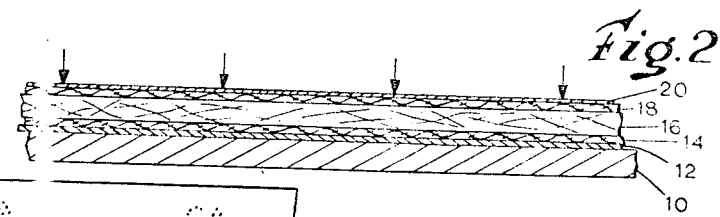
FIG. 2 is a cross-sectional view taken through the layup prior to molding.

To carry out the teachings of the present invention, the release sheet must be "reverse" printed with whatever identifying indicia is to appear on the finished molded panel. In other words, the indicia placed on the paper must be a mirror image of the indicia desired on the finished panel. In the present instance, the completed panel 21 is shown provided with a trademark 22 (FIG. 3) for indicating the source of the product, and with a further mark 24 for signifying the type of board being produced. The marks 22 and 24, in the example being described, were printed in reverse (as shown in FIG. 1) on the release paper with an electrically non-conductive ink applied in a dot pattern. Thereby, any stray currents, however small, will be prevented from flowing through the inked areas of the panel. In the present instance, a heat-setting or flash-dry type of ink was used because of its desirable property of being able to rid itself of solvent quickly at elevated temperatures. Hence, the ink will be rapidly dried on the hard surfaced paper 20 when it is passed through the heaters. This type of ink is also especially suited for use on the printed circuit panel disclosed herein since it is not adversely affected by the processing chemicals and solvents customarily employed in the printing, etching and soldering steps of printed circuit manufacture.

Figure 3:
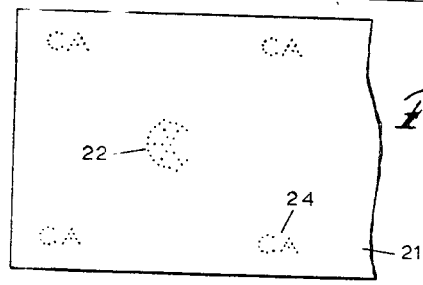
FIG. 3 is a view showing a portion of the molded panel with the desired marking impressed thereon.

When the release sheet is stripped from the molded panel, it will be found that the ink indicia has been transferred to the plastic surface of the panel as indicated in FIG. 3. It will also be found that the ink material has become so firmly rooted in the plastic surface of the panel as to become essentially an integral part thereof.

Although only one particular type of resin system has been described in connection with the present embodiment of the invention, namely, a solution of methacrylate polymer in methacrylate monomer, it is to be understood that the new marking system is not limited to this specific type of resin system but that other solutions of polymers in reactive type monomers may also be used as the molding material. For example, in addition to the methacrylate resin system heretofore mentioned, it is possible to employ solutions of other polymers such as polystyrene, polydiallylphthalate, copolymers of styrene and methacrylate and alpha-beta unsaturated polyesters, in other monomers such as styrene, diallylphthalate, and methyl styrene. Any of these polymers or monomers may be used either singly or in mixtures with each other, that is, any one or more of the polymers may be combined with any one or more of the monomers to produce a molding syrup which, when molded in contact with the printed surface of the release sheet, will cause a transferal of the ink indicia onto the surface of the plastic article.

It is to be understood, of course, that the foregoing disclosure is intended to be illustrative only and that changes and modifications can be resorted to without departing from the scope of the invention.

What is claimed is:

1. The method of providing marking on a metallic foil clad molded plastic panel with ink indicia of contrasting color wherein the ink indicia is transferred in accurate image configuration from a release sheet to the surface of the panel during the molding operation to cause the indicia to become integrally united with the panel and to form a permanent part thereof, said method comprising the steps of forming a layup including a metallic foil positioned on a support member, placing a quantity of uncured mobile viscous heat curable thermosetting resin over said foil, assembling a reinforcement system in contact with said resin to form a resin-reinforcement layup, placing in contact wtih said reinforcement system a release sheet treated to be non-adherent with respect to the surface of the molded article and having the desired indicia reverse printed on the surface thereof with heat-setting ink, the sides of said sheet bearing the ink indicia being in facing relationship with said reinforcement system and spaced from said thermosetting resin thereby, placing said resin-reinforcement layup and assembled release sheet in a mold, simultaneously applying heat and pressure to said resin-reinforcement layup and release sheet to compress the same for impregnating said reinforcement system and filling said mold and to initiate and to effect substantially complete curing of said uncured thermosetting resin while simultaneously effecting transfer in accurate image configuration of the ink indicia from the release sheet directly to the surface of the panel and causing the ink indicia to become embedded in the thermosetting resin on the surface of said panel, and stripping the release sheet from the surface of the molded panel after the cured resin mixture is relatively cool and rigid.

2. The method as set forth in claim 1 wherein said indicia on said release sheet is in a dot pattern.

3. The method as set forth in claim 1 wherein said thermosetting resin is selected from the group consisting of polydiallylphthalate and polystyrene polymers, copolymers of styrene, methacrylate copolymers and alpha-beta unsaturated polyester copolymers, and monomeric styrene, monomeric diallylphthalate, monomeric methyl styrene, monomeric methyl methacrylate, and mixtures thereof.

4. The method as set forth in claim 1 wherein said metallic foil is copper, and reinforcement system includes glass cloth and a layer of matted glass fibers in contact with said thermosetting resin and a layer of glass cloth between said release sheet and said fibers.

5. The method as set forth in claim 1 wherein said reinforcement system includes matted glass fibers.

6. The method as set forth in claim 1 wherein said reinforcement system includes matted glass fibers and woven glass cloth positioned on the side of said resin mixture opposite said foil and said release sheet being in contact with said glass cloth.

7. The method as set forth in claim 1 wherein said release sheet is a sheet of vegetable parchment paper treated with a release agent.

8. The method as set forth in claim 1 wherein a glass cloth is placed in contact with said foil, and wherein said resin mixture is placed on said glass cloth and leveled.

References Cited

UNITED STATES PATENTS

| 1,742,516 | 1/1930 | Mills | 264—132 X |
| 3,309,254 | 3/1967 | Rowe | 161—97 X |

FOREIGN PATENTS

| 560,184 | 7/1946 | Great Britain. |

T. J. CARVIS, Assistant Examiner

ROBERT F. WHITE, Primary Examiner

U.S. Cl. X.R.

264—255, 257